United States Patent
Noh et al.

(10) Patent No.: US 9,368,806 B2
(45) Date of Patent: Jun. 14, 2016

(54) EJECTOR FOR FUEL CELL SYSTEM

(71) Applicant: Hyundai Motor Company, Seoul (KR)

(72) Inventors: Yong Gyu Noh, Gyeonggi-Do (KR); Se Kwon Jung, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,746

(22) Filed: Dec. 7, 2014

(65) Prior Publication Data

US 2015/0333339 A1    Nov. 19, 2015

(30) Foreign Application Priority Data

May 16, 2014    (KR) .................. 10-2014-0058698

(51) Int. Cl.
*H01M 8/02* (2006.01)
*H01M 8/04* (2006.01)
*B05B 1/30* (2006.01)

(52) U.S. Cl.
CPC ............... *H01M 8/02* (2013.01); *B05B 1/3013* (2013.01); *H01M 8/04* (2013.01); *H01M 8/04097* (2013.01); *Y02E 60/50* (2013.01)

(58) Field of Classification Search
None
See application file for complete search history.

(56) References Cited

U.S. PATENT DOCUMENTS

| 2009/0317691 | A1 | 12/2009 | Yamada et al. |
| 2010/0209818 | A1* | 8/2010 | Fukuma ............ F04F 5/20 429/513 |

FOREIGN PATENT DOCUMENTS

| JP | 2002056869 | A | * | 2/2002 |
| JP | 2006-169977 | A | | 6/2006 |
| JP | 2006252863 | A | * | 9/2006 |
| KR | 10-0381194 | B1 | | 4/2003 |
| KR | 10-0773345 | B1 | | 10/2007 |
| KR | 10-2012-0136708 | A | | 12/2012 |
| WO | 2012-106564 | A1 | | 8/2012 |

OTHER PUBLICATIONS

J-PatPlat Machine Translation of the detailed description of JP 2002-056869A (Feb. 2002).*

* cited by examiner

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

An ejector for supplying a fuel, such as hydrogen, to a stack in a fuel cell system can automatically move a position of a nozzle according to an increase or a decrease of a system load. As a result, it is possible to control a necessary supply of hydrogen and a recirculation flow rate by selecting an area of a nozzle throat in the fuel cell system using the ejector, and specifically, of being automatically controlled to supply hydrogen through a small nozzle at a low load, such that a recirculation amount is increased.

6 Claims, 5 Drawing Sheets

EJECTOR FOR FUEL CELL SYSTEM

CROSS-REFERENCE TO RELATED APPLICATION

This application claims under 35 U. S. C. §119(a) the benefit of Korean Patent Application No. 10-2014-0058698 filed on May 16, 2014, the entire contents of which are incorporated herein by reference.

BACKGROUND (a) Technical Field

The present invention relates to an ejector for a fuel cell system, more particularly, to an ejector for supplying a fuel (such as hydrogen) to a stack in a fuel cell system.

(b) Description of the Related Art

In general, a fuel cell system is a kind of electric power generation system that converts chemical energy of a fuel into electric energy.

Such a fuel cell system includes a fuel cell stack, a fuel supply system for supplying a fuel (e.g., hydrogen) to the fuel cell stack, an air supply system for supplying oxygen in air, which is an oxidizing agent required for an electrochemical reaction, to the fuel cell stack, and a cooling system for exhausting reaction heat of the fuel cell stack to an outside of the system and controlling a driving temperature of the fuel cell stack.

As shown in FIG. 5 (RELATED ART), a fuel supply and recirculation system in a conventional fuel cell system basically includes a hydrogen supply line 110 connected to a hydrogen storage tank 100, a hydrogen recirculation line 120 through which the unreacted hydrogen of a fuel cell stack 170 is recirculated, an ejector 140a and 140b installed at a node where a stack inlet 130 and the hydrogen recirculation line 120 meet to pump new hydrogen and recirculated hydrogen toward an anode of a fuel cell stack, a stack inlet pressure sensor 150 installed on the hydrogen supply line 110 to measure the pressures of hydrogen and air, and a regulator 160 installed on the hydrogen supply line 110.

In this case, the ejector 140a and 140b ejects the compressed hydrogen supplied from a high-pressure tank through a nozzle to generate a vacuum, such that the exhaust gas in the fuel cell stack is absorbed to recirculation hydrogen gas.

A blower may be used as a recirculation means for the fuel cell system described above, but the blower, which is a motor-based actuator, is expensive and components such as bearings may be easily corroded due to condensate of the recirculation gas. In addition, when a rotational component is stuck due to the condensate, the rotational component may be thawed by use of a heater, which would undesirably increase the complexity of such an arrangement.

An ejector, which serves as a simple solution to the above-described problems, ejects a jet through a nozzle by using the hydrogen of about 100 barg at a rear end of a high-pressure regulator to generate a momentum that is required to supply and recirculate fuel at the same time.

However, when a diameter of the nozzle is enlarged, a speed of the jet decreases so that absorbing performance of the ejector deteriorates.

For this reason, although it is advantageous in performance to reduce a size of the ejector nozzle, there is a need to enlarge a throat area of the nozzle in order to supply a large amount of fluid for a great load.

As a possible solution, there has been proposed a technique of disposing a large ejector 140b and a small ejector 140a.

As shown in FIG. 5, when a large ejector is provided, the ejector must use either a large nozzle or a small nozzle according to an amount of load such that the large nozzle is used for a large amount of load and the small nozzle is used for a small amount of load.

The performance of an ejector may be classified according to recirculation performance by fuel supply and pump. The larger the size of a nozzle may be, the larger amount of fuel flow may be supplied under the same pressure. However, when the nozzle is large, the pumping performance deteriorates due to a low jet speed for a small amount of fluid. Although a small size nozzle has good aerodynamic performance since the small size nozzle has a high flow speed even in low-level supply, the small size nozzle could not fulfill a request to supply a large amount of fluid.

In consideration of the above, an apparatus for controlling a supply of hydrogen fuel for a fuel cell system had been proposed in Korean Unexamined Patent Publication No. 10-2012-0136708.

As shown in FIG. 6 (RELATED ART), the apparatus for controlling the supply of hydrogen fuel for a fuel cell system includes an ejector 200 installed at a fuel cell stack inlet to supply hydrogen to the fuel cell stack and to form a recirculation flow, a proportional-control solenoid valve 220 connected to a hydrogen supply line to communicate with a nozzle inlet 210 of the ejector 200 to control the supply of hydrogen, and a valve controller (not shown) for controlling driving of the proportional-control solenoid valve 220 according to an output of the fuel cell system.

In this case, the valve controller controls the driving of the proportional-control solenoid valve in a scheme of pulse flow control in a low output section, where an output in a current state is less than a preset reference output.

Reference numeral 230 is an ejector nozzle, and reference numerals 240 and 250 represent an ejector outlet and a valve body, respectively.

According to the above technique, the performance of a low-load ejector is improved through a pulse hydrogen supply. The value controlling the pulse hydrogen supply, which is a proportional-control valve, supplies a pulse flow to the nozzle through a fast ON/OFF operation at a low load. In addition, under a great load condition as a fuel supply condition, quiet driving can be achieved through an up and down movement of a plunger.

However, in the above technique, a low load driving range must be set and the larger the range is, the greater the number of ON/OFF operations, so that a harsh request is generated in the valve.

In particular, it is required to perform the pulse flow through the least displacement in a small range if possible. It is the most ideal to obtain required aerodynamic performance without any pulse flow.

In other words, the pumping efficiency of an ejector is improved so that valve durability may be secured and noise generation may be suppressed.

SUMMARY

It is an object of the present invention to provide an ejector which is capable of automatically moving a position of a nozzle according to an increase or a decrease of a system load, of controlling a necessary supply of hydrogen and a recirculation flow rate by selecting an area of a nozzle throat in a fuel cell system using an ejector, and specifically, of being automatically controlled to supply hydrogen through a small nozzle at a low load such that a recirculation amount is increased.

To achieve the above object, according to the present invention, there is provided an ejector for a fuel cell system having the following features.

The ejector for a fuel cell system, which is installed on a recirculation flow path of a fuel cell to pump and supply new hydrogen and recirculation gas to an anode of a fuel cell stack, includes an ejector body having a hydrogen outlet on a front end and a recirculation hydrogen inlet on a rear end; a nozzle installed in the ejector body to communicate with a flow control valve for controlling supply of hydrogen; a nozzle body having a hydrogen flow path; and a nozzle device installed at the nozzle body and configured to provide a hydrogen flow path, the nozzle body varying an area of a nozzle throat according to an increase or decrease of a system load such that the supply of hydrogen and a recirculation flow rate are controlled.

Specifically, the nozzle device includes a nozzle cap installed at a front end of the nozzle body; a valve nozzle configured to provide a hydrogen flow route, disposed in parallel with an inner shaft line of the nozzle cap, and for opening or closing an inside of the nozzle cap and the hydrogen flow path while being elastically supported by a spring to move; and a bush configured to provide a flow route of hydrogen introduced into the nozzle cap by using a plurality of holes while concentrically interposing between the nozzle cap and the valve nozzle.

Therefore, the ejector for a fuel cell system is capable of automatically moving a position of a nozzle according to an increase or a decrease of a system load when the system is driven at a low load or a middle or high load and changing an area of a nozzle throat such that supply of hydrogen and a recirculation flow rate can be adjusted.

Preferably, a valve sheet is formed at a rear end of the valve nozzle and for opening or closing the inside of the nozzle cap and the hydrogen flow path while selectively closing an orifice of the hydrogen flow path in the nozzle body.

Still preferably, a protrusion is formed at a rear end of the valve nozzle and protrudes more backward than a rear surface of a valve sheet, such that a vortex and a pressure drop of the hydrogen may be induced.

The ejector for a fuel cell system may automatically move a position of a nozzle according to an increase or a decrease of a system load, control necessary supply of hydrogen and a recirculation flow rate by selecting an area of a nozzle throat in a fuel cell system using an ejector, and specifically, be automatically controlled to supply hydrogen through a small nozzle at a low load such that a recirculation amount is increased, so that pumping efficiency of the ejector is improved, a configuration is secured in the valve, and noise is prohibited from being generated.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
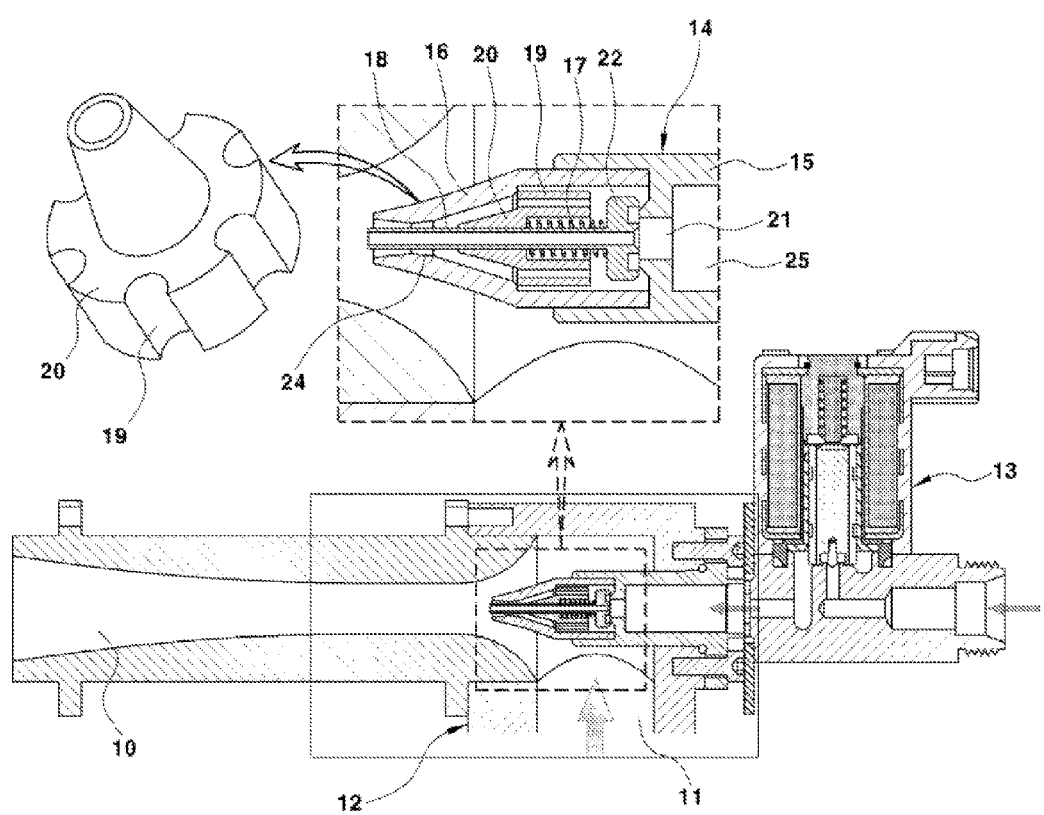
FIG. 1 is a sectional view showing an ejector for a fuel cell system according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a sectional view showing an ejector for a fuel cell system according to an embodiment of the present invention.

As shown in FIG. 1, the ejector is installed at an inlet of a fuel cell stack to supply new hydrogen and recirculated hydrogen to the fuel cell stack through pumping.

A flow control valve 13 is connected to a rear end of the ejector such that the hydrogen (new hydrogen) is sent to the ejector to be supplied to the stack at a flow rate controlled through the flow control valve 13.

In this case, a conventional flow control valve, for example, which has the same structure as that of the flow control valve disclosed in Korean Unexamined Patent Publication No. 10-2012-0136708, may serve as the flow control valve 13, and the details thereof will be omitted.

The ejector includes an ejector body 12. The ejector body 12 has a structure where a mixer which induces the hydrogen sprayed through the nozzle 14 to the stack is sequentially coupled to a body which receives a diffuser and the nozzle 14.

An outlet 10 is formed at a front end of the ejector body 12, that is, front ends of the mixer and the diffuser so that the hydrogen ejected through the hydrogen outlet 10 may be supplied to the stack. A recirculation hydrogen inlet 11 is formed at or under a rear end of the ejector body 12, so that the recirculation hydrogen introduced into the ejector body 12 through the recirculation hydrogen inlet 11 may be mixed with the new hydrogen to be supplied to the stack.

In addition, the ejector includes the nozzle 14 for spraying hydrogen. The nozzle 14 is coupled to the rear end of the ejector body 12 to be supported and is placed at an inside of the ejector body 12.

The nozzle 14 may include a nozzle body 15, a nozzle cap 16, a valve nozzle 18, a bush 20.

The nozzle body 15 may communicate with the flow control valve 13 through a rear end thereof. A hydrogen flow path 25 through which the hydrogen flows and an orifice 21 through which the hydrogen is exhausted are formed in the nozzle body 15.

Thus, the hydrogen sent from the flow control valve 13 flows along the hydrogen flow path 25 and passes through the orifice 21. Then, after passing through the valve nozzle 18, the mixer and the diffuser, the hydrogen is ejected through the hydrogen outlet 10 to be introduced into the stack.

The nozzle cap 16, which has a shape of a hollow cap, is installed in parallel to a front end of the nozzle body 15, such that the hydrogen passes through an inside of the nozzle cap 16.

The valve nozzle 18, which has a shape of a pipe to allow the hydrogen to pass therethrough, is disposed in parallel to an inner central axis of the nozzle cap 16. In addition, the valve nozzle 18 is supported to be enable to slide on inner wall surfaces of a plurality of brackets 24 which is formed on an inner wall of the front end of the nozzle cap 16 and the bush 20 which will be described below.

A gap is formed between a circumference of the front end of the nozzle cap 16 and an inner wall of the valve nozzle 18, so that the hydrogen introduced into the bush 20 through the gap may be exhausted through the front end of the nozzle cap 16.

In addition, the valve nozzle 18 may be elastically supported by a spring 17, one side of which is supported by one side of the bush 20, so that the valve nozzle 18 always receives force of the spring 17 to be pushed in a backward direction.

Specifically, a valve sheet 22, which has a diameter relatively larger than that of the valve nozzle, is formed at the rear end of the valve nozzle 18. In this case, the valve sheet 22 may allow the hydrogen path to be opened or closed to the inside of the nozzle cap by selectively blocking the orifice 21 of the hydrogen path 25 in the nozzle body 13.

For example, the valve nozzle 18 including the valve sheet 22 may move in forward and/or backward directions in a straight line while being entirely and elastically supported by the spring 17. Thus, the valve sheet 22 may move in the forward direction or be restored in the backward direction according to the correlation between the hydrogen pressure applied to the rear surface of the valve sheet 22 and the spring force.

Thus, in the state that the valve sheet 22 and the valve nozzle 18 move in the forward direction, while the valve sheet 22 is separated from the orifice 21, the inside of the nozzle cap 16 communicates with the hydrogen path 25, so that the hydrogen may flow into the inside of the nozzle cap 16.

In addition, in the state that the valve sheet 22 and the valve nozzle 18 are restored in the backward direction, while the valve sheet 22 is closely attached to the orifice 21, the inside of the nozzle cap 16 is shut off from the hydrogen path 25, so that the hydrogen may be supplied only through the valve nozzle 18.

The bush 20 is disposed on a concentric circle between the nozzle cap 16 the valve nozzle 18 and is fitted with the inner wall surface of the valve nozzle 18.

A plurality of holes 19 are formed on the bush 20 and disposed along an outer periphery of the bush 20, such that the hydrogen flowing into the nozzle cap 16 may escape through the holes 19 to be ejected through the front end of the nozzle cap 16.

In the case of the spring 17 elastically supporting the valve nozzle 18, while the spring 17 is placed in a groove provided in the bush 20, both ends of the spring 17 may be supported and installed between the side of the bush 20 and the side of the valve sheet 22.

Meanwhile, in the case of the valve nozzle 18 having the valve sheet 22, a protrusion 23 (see FIG. 4) protruding from a rear surface of the valve sheet 22 is formed on the rear end of the valve nozzle 18, at which the valve sheet is placed, such that a vortex and a pressure drop of the hydrogen dashing against the rear surface of the valve sheet 22 are induced. In particular, due to the vortex and the pressure drop, the transition zone may be fluent in a fluid flow characteristic curve.

Thus, according to the present invention, the ejector has a valve structure in the nozzle while connecting with the flow control valve. The nozzle includes a valve nozzle (a small nozzle or an inner nozzle), an outer nozzle (a large nozzle), a spring, a bush and a nozzle cap.

In the structure and shape of the nozzle, the area of the nozzle throat and the flow rate vary by the flow control valve electrically controlled and the valve in the nozzle Then, ON/OFF operation of the nozzle valve is operated according to equilibrium of forces as follows:

$$Fs > (Pin - Pout) \times Av \rightarrow \text{Closing of nozzle valve,}$$

$$Fs < (Pin - Pout) \times Av \rightarrow \text{Opening of nozzle valve,}$$

where Pin is a downstream pressure of the flow control valve, Pout is a rear end pressure of the nozzle valve, Av is an area of the orifice, and Fs is force (−kx) of the spring.

According to the above relationship, Av and Fs are predetermined design values, Pin is a control variable varying according to the position of a plunger.

In particular, as the current applied to the flow control valve is increased, the pressure of the nozzle inlet is increased. When the pressure reaches to a threshold pressure, the nozzle valve starts to be opened so that the flow rate is increased, thereby supplying hydrogen to the valve nozzle and the outer nozzle at the same time.

In conclusion, the hydrogen is enabled to be supplied to the small nozzle (nozzle valve) under a low load and to the large nozzle (Nozzle valve+Nozzle cap) under a great load.

Figure 2:
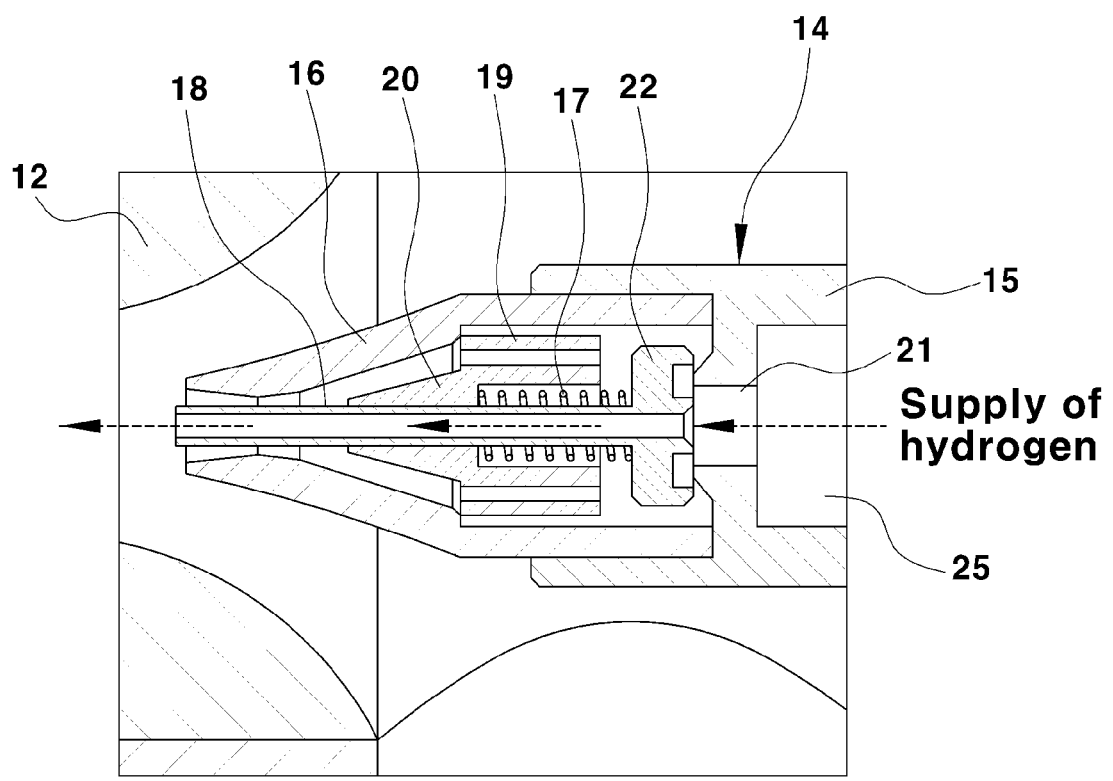
FIG. 2 is a sectional view showing a state of an ejector for a fuel cell system when the ejector is driven under a low load according to an embodiment of the present invention.

FIG. 2 is a sectional view showing a state of an ejector for a fuel cell system when the ejector is driven under a low load according to an embodiment of the present invention.

FIG. 2 shows a close state of a nozzle valve as follows:

$$Fs > (Pin - Pout) \times Av \rightarrow \text{Closing of nozzle valve.}$$

Since a valve opening degree of the flow control valve is small under a low-load driving condition, the downstream pressure (Pin) of the flow control valve is decreased to be lower than the force of the spring 17. As a result, all hydrogen is supplied to the valve nozzle 18.

Since the inner diameter of the valve nozzle 18 is small, a high speed may be obtained under the same pressure. Thus, excellent absorbing performance (aerodynamic performance) under a low-load driving condition required to the fuel cell system is achieved.

Figure 3:
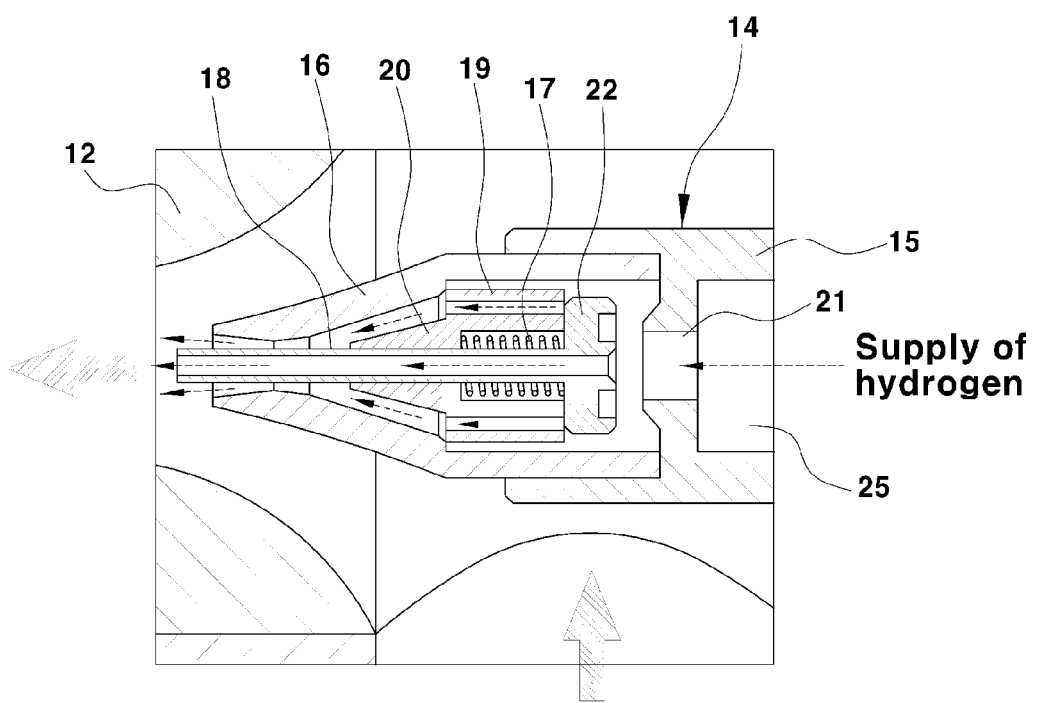
FIG. 3 is a sectional view showing a state of an ejector for a fuel cell system when the ejector is driven under a middle or high load according to an embodiment of the present invention.

FIG. 3 is a sectional view showing a state of an ejector for a fuel cell system when the ejector is driven under a middle or high load according to an embodiment of the present invention.

FIG. 2 shows an open state of a nozzle valve as follows:

$$Fs < (Pin - Pout) \times Av \rightarrow \text{Opening of nozzle valve.}$$

The plunger of the flow control valve increases the valve opening degree under the middle or high load, so that the downstream pressure (Pin) of the flow control valve is increased to be higher than the force of the spring 17.

Therefore, the valve nozzle 18 is open so that the hydrogen starts to be supplied to the valve nozzle 18 and the outer nozzle (the flow path in the nozzle cap).

As the opening degree of the flow control valve is increased, the downstream pressure (Pin) of the flow control valve is increased so that the valve nozzle 18 moves in a forward direction further away.

As the valve nozzle 18 moves in the forward direction, the amount of fluid is enabled to be increased.

In this case, the moving operation of the valve nozzle 18 may be designed to allow the bush 20 to restrain a vibration. The bush 20 is formed of a material capable of reducing friction or surface-treated.

Figure 4:
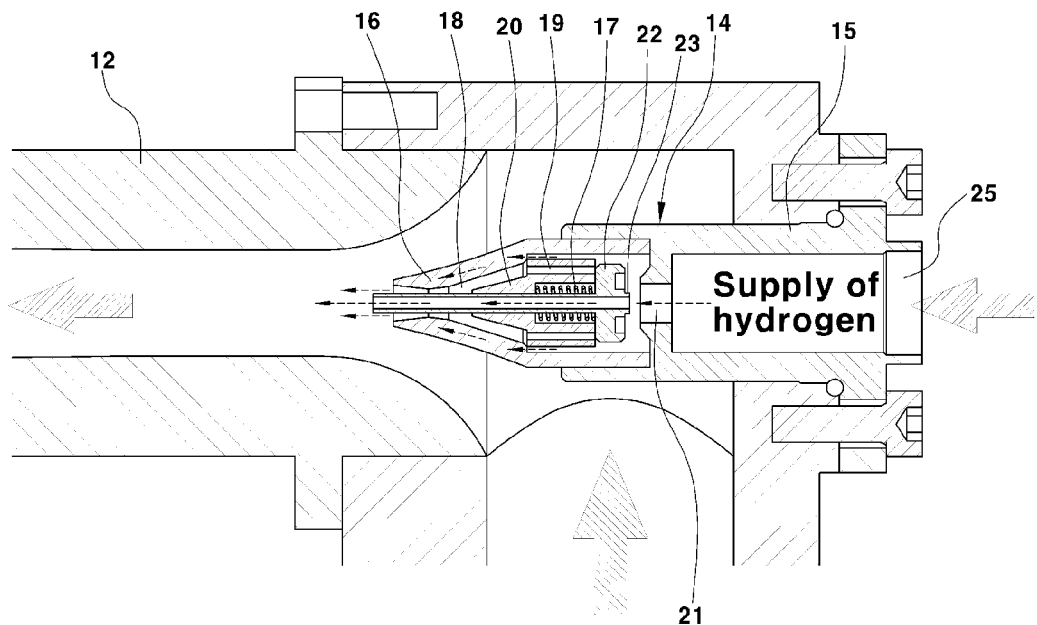
FIG. 4 is a sectional view showing a state of an ejector for a fuel cell system when the ejector is driven under a middle load (in a transition zone) according to an embodiment of the present invention.
Figure 5:
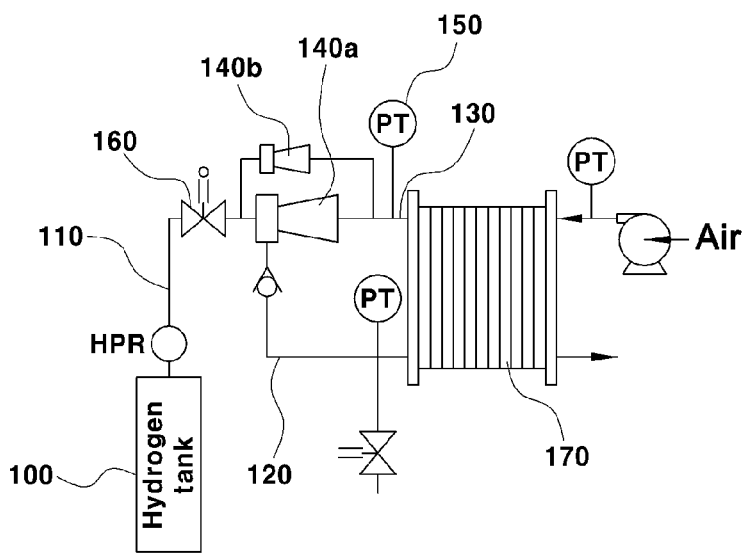
FIG. 5 (RELATED ART) is a schematic view showing a basic configuration of a fuel supply and recirculation system in a fuel cell system.
Figure 6:
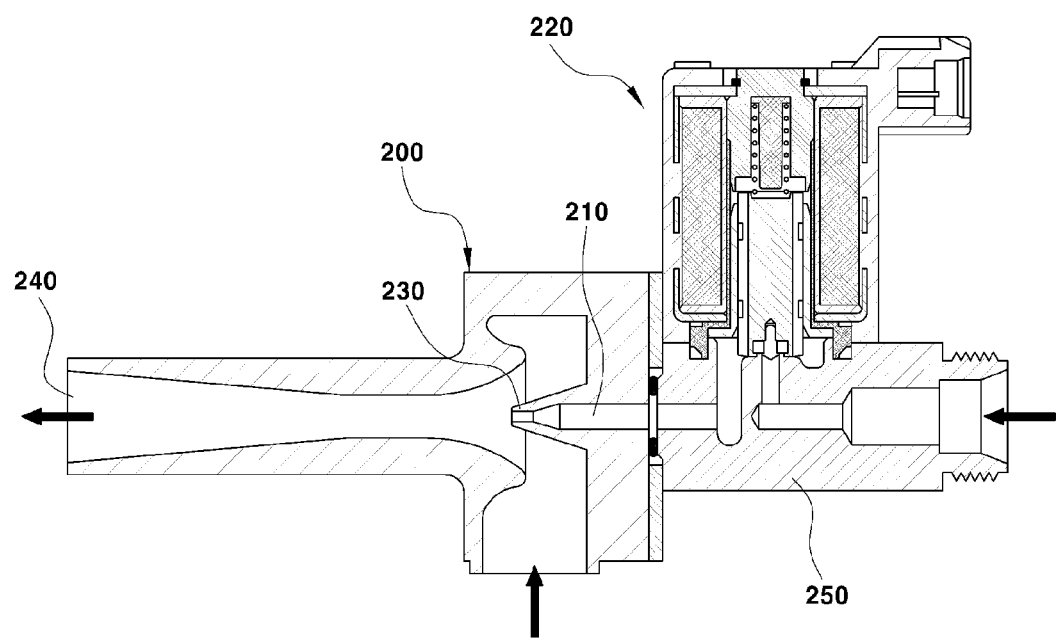
FIG. 6 (RELATED ART) is a sectional view showing an apparatus for adjusting supply of hydrogen fuel for a fuel cell system according to the related art.

FIG. 4 is a sectional view showing a state of an ejector for a fuel cell system when the ejector is driven under a middle load (in a transition zone) according to an embodiment of the present invention.

As shown in FIG. 4, in a driving zone under the middle load, the valve nozzle 18 is opened by the pressure of Pin increased by the control of the flow control valve.

When the valve nozzle 18 begins to be opened, the equilibrium of forces may be rapidly changed, so that the pressure and the flow rate may be caused to rapidly vary in the fluid flow characteristic curve.

Since the instability and non-linearity are very disadvantageous conditions for the control of the flow control valve, the instability and non-linearity must be taken into consideration in view of hardware.

As shown in FIG. 4, the protrusion 23 of the valve nozzle 18 reduces the instability caused when the valve begins to be opened or is closed.

The area of the flow path of the orifice is enabled to be more gradually changed, so that the vortex and pressure drop caused by the protrusion may allow the transition zone in the fluid flow characteristic curve to be fluent.

As described above, according to the present invention, there is provided a new ejector which has the valve structure in the nozzle and is capable of allowing hydrogen fuel to be supplied or controlled through the hydrogen pressure control by the flow control valve (proportional control valve) at a nozzle upstream. Further, according to the present invention, the hydrogen is supplied only through the valve nozzle at a low load and the valve nozzle moves to construct a large nozzle at a middle or high load. In addition, the protrusion structure of the valve nozzle is applied to fluently change the transition zones of the valve nozzle and the outer nozzle, so that, when the valve nozzle moves, the friction is not great and any foreign materials are not output. In addition, the bush, the nozzle cap and the spring are applied for the purpose of the stable movement of the valve nozzle, so that the pumping efficiency of the ejector may be improved. Thus, the durability of the valve may be secured and noise may be prohibited from being generated.

Although the present invention has been described in detail until now, the scope of the present invention is not limited to the description but various modifications made by those skilled in the art using the basic concept of the present invention defined by the claims also fall within the scope of the present invention.

What is claimed is:

1. An ejector for a fuel cell system, the ejector comprising:
   an ejector body having a hydrogen outlet on a front end and a recirculation hydrogen inlet on a rear end; and
   a nozzle installed in the ejector body to communicate with a flow control valve for controlling a supply of hydrogen,
   wherein the nozzle comprises:
   a nozzle body having a hydrogen flow path; and
   a nozzle device installed at the nozzle body and configured to provide a hydrogen flow path, the nozzle body varying an area of a nozzle throat according to an increase or decrease of a system load such that the supply of hydrogen and a recirculation flow rate are controlled,
   wherein the nozzle device comprises:
   a nozzle cap installed at a front end of the nozzle body;
   a valve nozzle configured to provide a hydrogen flow route, disposed in parallel with an inner shaft line of the nozzle cap, and for opening or closing an inside of the nozzle cap and the hydrogen flow path while being elastically supported by a spring to move; and
   a bush configured to provide a flow route of hydrogen introduced into the nozzle cap by using a plurality of holes while concentrically interposing between the nozzle cap and the valve nozzle.

2. The ejector of claim 1, further comprising a valve sheet formed at a rear end of the valve nozzle and for opening or closing the inside of the nozzle cap and the hydrogen flow path while selectively closing an orifice of the hydrogen flow path in the nozzle body.

3. The ejector of claim 1, further comprising a protrusion formed at a rear end of the valve nozzle, wherein the protrusion protrudes more backward than a rear surface of a valve sheet.

4. The ejector of claim 1, further comprising a valve sheet formed at a rear end of the valve nozzle and for opening or closing the inside of the nozzle cap and the hydrogen flow path while selectively closing an orifice of the hydrogen flow path in the nozzle body.

5. The ejector of claim 1, further comprising a protrusion formed at a rear end of the valve nozzle, wherein the protrusion protrudes more backward than a rear surface of a valve sheet.

6. The ejector of claim 1, wherein the ejector is installed in a fuel cell vehicle.

\* \* \* \* \*